United States Patent
Yamazaki et al.

(10) Patent No.: US 9,664,920 B2
(45) Date of Patent: May 30, 2017

(54) OPTICAL ELEMENT

(71) Applicant: OLYMPUS CORPORATION, Tokyo (JP)

(72) Inventors: Takeshi Yamazaki, Tokyo (JP); Toshiaki Suzuki, Tokyo (JP)

(73) Assignee: Olympus Corporation, Tokyo (JP)

( * ) Notice: Subject to any disclaimer, the term of this patent is extended or adjusted under 35 U.S.C. 154(b) by 127 days.

(21) Appl. No.: 14/490,486

(22) Filed: Sep. 18, 2014

(65) Prior Publication Data

US 2015/0002951 A1    Jan. 1, 2015

Related U.S. Application Data

(63) Continuation of application No. PCT/JP2013/001877, filed on Mar. 19, 2013.

(30) Foreign Application Priority Data

Mar. 21, 2012 (JP) .................................. 2012-064055

(51) Int. Cl.
*G02B 5/04* (2006.01)
*G02B 27/56* (2006.01)
(Continued)

(52) U.S. Cl.
CPC ........... *G02B 27/56* (2013.01); *G02B 3/0056* (2013.01); *G02B 3/0068* (2013.01); *G02B 5/045* (2013.01);
(Continued)

(58) Field of Classification Search
CPC .... G02B 5/045; G02B 27/56; G02B 27/0081; G02B 6/0055; G02B 3/0068;
(Continued)

(56) References Cited

U.S. PATENT DOCUMENTS 5,091,983 A * 2/1992 Lukosz ................. G01D 5/266
                                                        250/231.19
5,291,567 A * 3/1994 Revelli, Jr. .................... 385/14

FOREIGN PATENT DOCUMENTS

JP             09-101466            4/1997
JP    WO 2006025317 A1 *  3/2006  ........... G02B 6/0018
(Continued)

OTHER PUBLICATIONS

Alex Cameron, "The Application of Holographic Optical Waveguide Technology to Q-Sight Family of Helmet Mounted Displays". Proc. of SPIE vol. 7326 73260H-1, Apr. 2009.
(Continued)

*Primary Examiner* — Scott J Sugarman
*Assistant Examiner* — Mustak Choudhury
(74) *Attorney, Agent, or Firm* — Andrews Kurth Kenyon LLP

(57) ABSTRACT

An optical element includes a waveguide and a deflector. The waveguide propagates light incident at a predetermined angle while reflecting the light between the first plane and the second plane. The deflector is formed as a plate having a third plane being opposed to the first plane in the deflector, the first plane and the third plane are spaced apart from each other at a distance smaller than a propagation distance capable of propagating an evanescent wave of first light. The deflector has a plurality of reflecting surfaces arranged on the rear side of the third plane. The reflecting surfaces reflect the first light that has been incident on the first plane to be propagated as an evanescent wave, into a direction substantially perpendicular to the first plane. A medium interposed between the first plane and the third plane has a refractive index lower than that of the waveguide.

14 Claims, 14 Drawing Sheets

(51) Int. Cl.
   *G02B 27/00*     (2006.01)
   *G02B 3/00*      (2006.01)
   *F21V 8/00*      (2006.01)

(52) U.S. Cl.
   CPC ......... *G02B 6/0031* (2013.01); *G02B 6/0053* (2013.01); *G02B 6/0055* (2013.01); *G02B 27/0081* (2013.01)

(58) Field of Classification Search
   CPC .. G02B 6/0031; G02B 6/0053; G02B 3/0056; G02B 27/01; G02B 27/0101; G02B 27/0103; G02B 27/017; G02B 27/0172; G02B 27/42; G02B 27/4233
   USPC ...... 359/13, 34, 489.08, 567, 618, 629, 630, 359/833, 834; 362/398; 385/36, 37
   See application file for complete search history.

(56) References Cited

FOREIGN PATENT DOCUMENTS

| | | |
|---|---|---|
| JP | 2007-505353 | 3/2007 |
| WO | 2006/025317 | 3/2006 |
| WO | 2013/038626 | 3/2013 |

OTHER PUBLICATIONS

International Search Report, dated Apr. 16, 2013, issued in corresponding International Application No. PCT/JP2013/001877.

\* cited by examiner

OPTICAL ELEMENT

CROSS REFERENCE OF RELATED APPLICATION

The present application is a Continuing Application based on International Application PCT/JP2013/001877 filed on Mar. 19, 2013, which, in turn, claims the priority from Japanese Patent Application No. 2012-64055 filed on Mar. 21, 2012, the entire disclosure of which is incorporated herein by reference.

TECHNICAL FIELD

The present invention relates to an optical element with an expanded exit pupil.

BACKGROUND ART

A variety of known display devices are projection-type displays that display a projected image. In order to observe the projected image, the observer's eye needs to be aligned with the exit pupil of the projection optical system. Therefore, in order for the projected image to be observable at a variety of positions, the exit pupil is preferably made large. In a conventional projection-type display, however, the structure of an optical system with an expanded exit pupil is large and complex. Therefore, there has been a desire for simplifying the structure of an optical system with an expanded exit pupil. It has thus been proposed to enlarge the exit pupil with an optical element that uses a volume hologram (see Non-patent Literature 1).

CITATION LIST

Non-Patent Literature

NPL 1: Alex CAMERON, "The Application of Holographic Optical Waveguide Technology to Q-Sight Family of Helmet Mounted Displays", Proc. of SPIE Vol. 7326, April, 2009

SUMMARY OF INVENTION

Technical Problem

In the optical element described in NPL 1, a volume hologram is used to form a plurality of copies of the exit pupil, to thereby expand the exit pupil. However, the volume hologram is based on the diffraction properties of light, and thus lights being different in wavelength that enter the optical element are emitted at different angles therefrom depending on the wavelength. As a result, as illustrated in FIG. 14, when the image to be projected is a color image CI, the resulting multiple images MLI are displaced from one another for each wavelength.

Further, the copies of the exit pupil are formed not only on one surface of the optical surface but also on the other surface thereof. The optical element only requires a structure that allows for observability from at least one surface thereof, and emitting light fluxes from both surfaces reduces the use efficiency of light.

The present invention has been conceived in light of the above circumstances, and it is an object thereof to provide an optical element capable of emitting, in the same direction, a plurality of lights being different in wavelength, so as to offer improved use efficiency of light.

Solution to Problem

In order to solve the above problems, an optical element according to the present invention includes: a waveguide, formed as a plate having a first plane and a second plane being opposed to each other, that propagates first light incident at a predetermined angle while reflecting the first light between the first plane and the second plane; and a deflector, formed as a plate having a third plane being opposed to the first plane, the first plane and the third plane being spaced apart from each other at a distance smaller than a propagation distance capable of propagating an evanescent wave of the first light at a predetermined transmittance, the deflector having a plurality of reflecting surfaces arranged, along a first direction, on a rear side of the third plane, the reflecting surfaces reflecting, in a direction substantially perpendicular to the first plane, light that is incident on the first plane at the predetermined angle and propagated as an evanescent wave to the incident surface, in which the first plane and the third plane has a medium interposed therebetween, the medium having a refractive index lower than the refractive index of the waveguide.

Advantageous Effect of Invention

With the above-described structure, the optical element according to the present invention is capable of emitting light only from one surface of the optical element while expanding the exit pupil without changing the emitting direction of lights that are different in wavelength.

BRIEF DESCRIPTION OF DRAWINGS

The present invention will be further described below with reference to the accompanying drawings, wherein.

DESCRIPTION OF EMBODIMENTS

Figure 1:
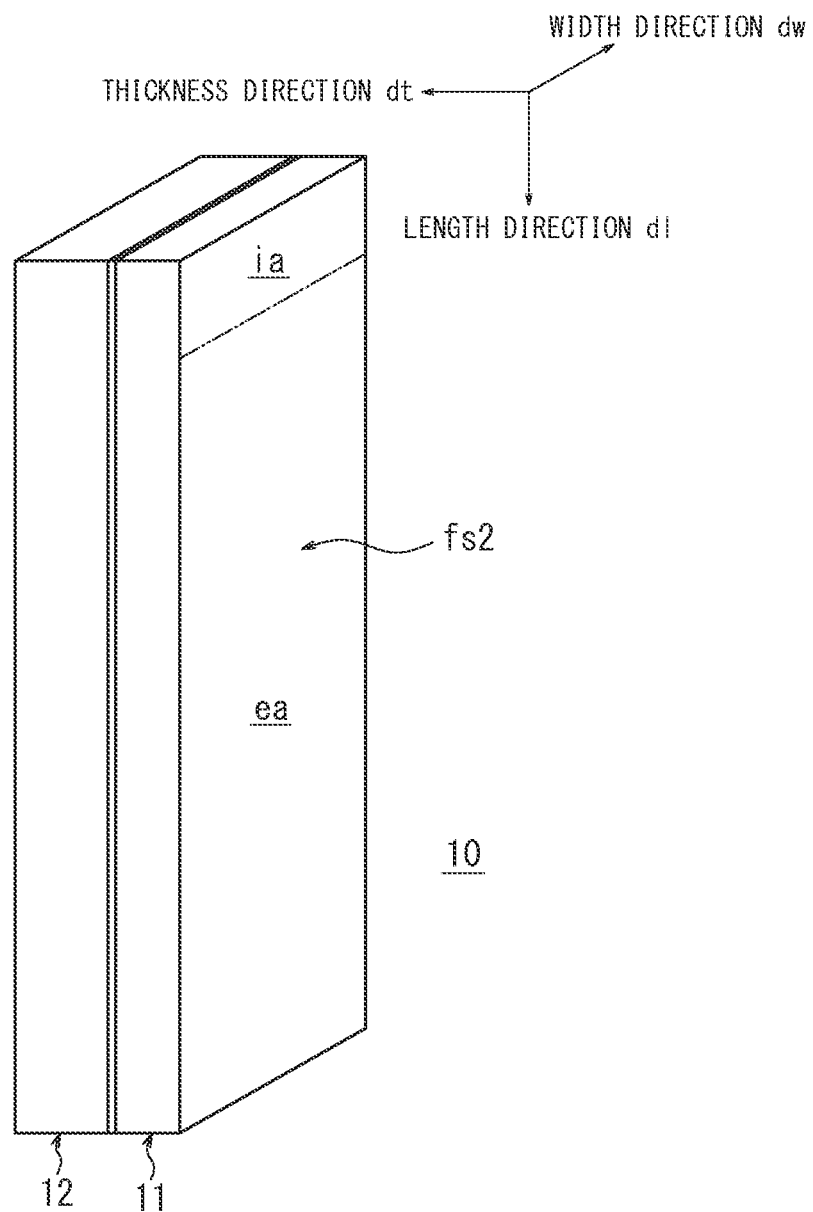
FIG. 1 is a perspective view of an optical element according to a first embodiment of the present invention.
Figure 2:
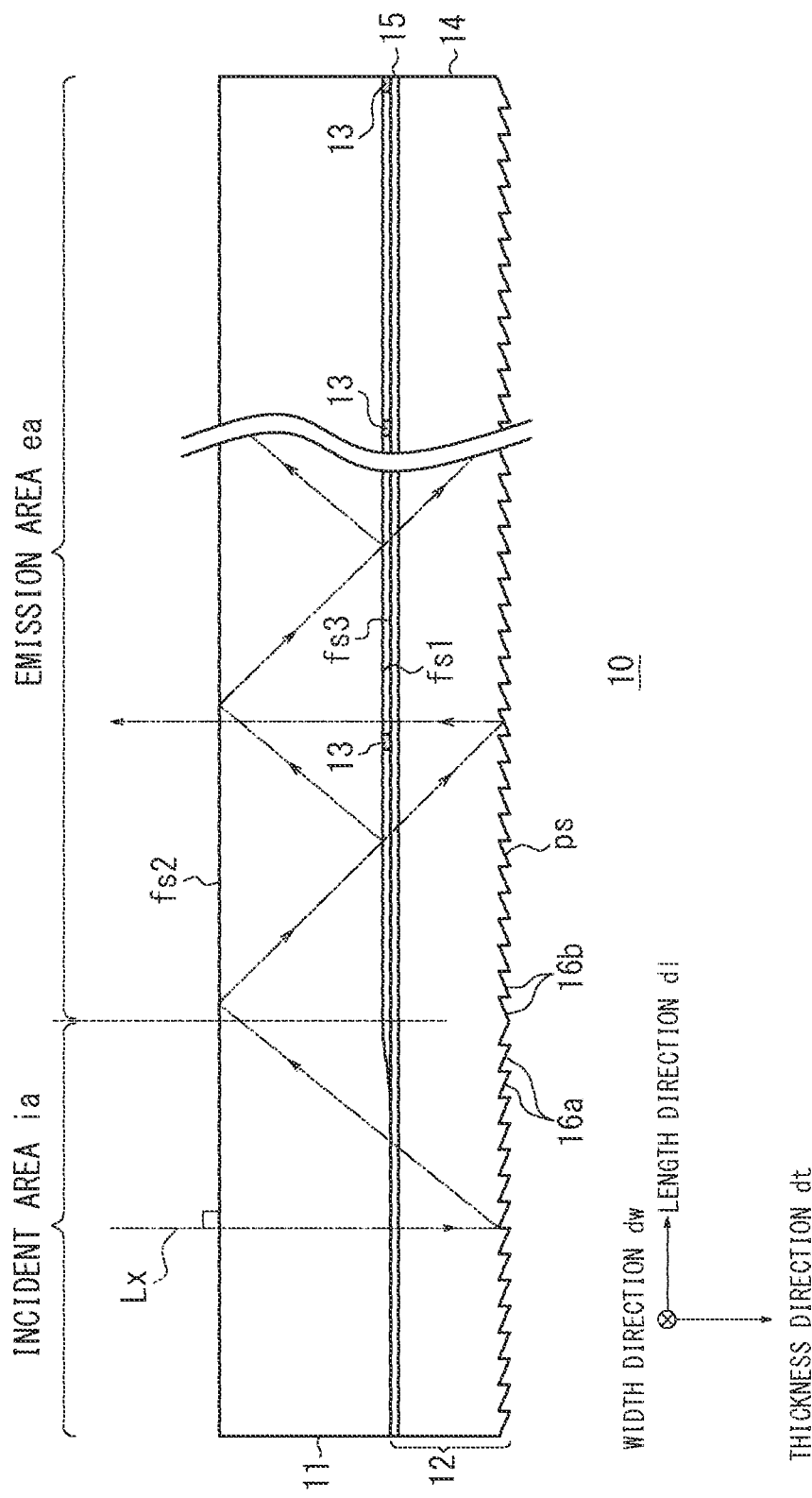
FIG. 2 is a side view of the optical element of the first embodiment.

In the following, embodiments of an optical element according to a certain aspect to which the present invention has been applied are described to with reference to the drawings. FIG. 1 is a perspective view of an optical element according to a first embodiment of the present invention. FIG. 2 is a side view of the optical element.

As illustrated in FIGS. 1 and 2, the optical element 10 includes a waveguide 11, a deflector 12, and spacers 13. The waveguide 11 is formed in a plate shape having, as plate planes, a first plane fs1 and a second plane fs2 being opposed to each other. The deflector 12 is formed in a plate shape having a third plane fs3 and a triangular prism array surface ps having a triangular prism array formed on the backside thereof. The deflector 12, is fixed to the waveguide 11 while having the first plane fs1 of the waveguide 11 and the third plane fs3 of the deflector 12 spaced apart from each other at a predetermined distance via the spacers 13, to thereby form the optical element 10.

Note that the optical element 10 is overall in the form of a flat, rectangular plate having long sides and short sides. In a plane perpendicular to the thickness direction dt of the plate, the direction along the long sides is labeled the length direction dl, and the direction perpendicular to the thickness direction dt and the length direction dl is labeled the width direction dw.

The waveguide 11 is formed using quartz. Quartz forming the waveguide 11 is hard, which provides an advantage that the second plane fs2 to be used as the total reflection surface is less susceptible to damage.

The deflector 12 is formed of, as illustrated in FIG. 2, an acrylic plate 14 and a glass white plate 15. The deflector 12 is formed by bonding the acrylic plate 14 and the glass white plate 15 to each other. In the deflector 12, a surface on the glass white plate 15 side serves as the third plane fs3 and a surface on the acrylic plate 14 side serves as the triangular prism array surface ps.

The triangular prisms formed on the triangular prism array surface ps of the deflector 12 are minute and formed by injection molding. Therefore, acrylic, an injection moldable transparent medium, is selected as an example of the material of the triangular prism array surface ps. Here, aluminum is vapor deposited on the triangular prism array surface ps, and thus, incident light is reflected at the triangular prism array surface ps.

In the present embodiment, the third plane fs3 of the deflector 12 is required to be high in profile irregularity. The use of the glass white plate 15 allows for achieving a high profile irregularity that is otherwise hard to obtain when acrylic is used alone.

The waveguide 11 and the deflector 12 are opposed to each other so that the first plane fs1 of the waveguide 11 and the third plane fs3 of the deflector 12 become substantially parallel to each other. Further, in an emission area ea to be described later, the waveguide 11 and the deflector 12 are fixed using the spacers 13 so that the first plane fs1 and the third plane fs3 are spaced apart at a predetermined distance to be described later. Nothing is filled inbetween the first plane fs1 and the third plane fs3. Therefore, the first plane fs1 and the third plane fs3 have an air layer interposed therebetween, the air layer having a refractive index of 1, in the incident area ia to be described later, the first plane fs1 and the third plane fs3 are adhered to each other.

Here, the first plane fs1 and the third plane fs3 are illustrated in FIG. 2 as being largely spaced apart from each other for the sake of easy understanding of the interspace therebetween. However, in practice, the first plane fs1 and the third plane fs3 are spaced apart from each other at a minute distance. Further, the spacers 13, which are illustrated to be in a larger size than in reality in FIG. 2 for the sake of clear indication of the spacers 13, are actually in a minute size. In addition, the first plane fs1 is illustrated in FIG. 2 in such a manner that two different planes are included in the first plane fs1 for the sake of making it easier to understand the configuration where the first plane fs1 and the third plane fs3 are adhered to each other in the incident area ia while being spaced apart from each other in the emission area ea, but the first plane fs1 is practically constituted of the same plane.

As will be described later, on the inside of the waveguide 11, light is obliquely incident on the first plane fs1 from the second plane fs2 side and totally reflected. However, when the first plane fs1 and the third plane fs3 are spaced apart at a minute distance (for example, 1 μm or less), an evanescent wave of the incident light penetrates the first plane fs1 so as to enter the deflector 12 via the third plane fs3. It should be noted that in the following description, the penetration of light from the first plane fs1 is referred to as transmission of light.

An evanescent wave to be transmitted to the deflector 12, with a transmittance of 1/e of the amount of light incident on the first plane fs1 has a propagation distance of $Z_{1/e}$, which is calculated by Equation (1).

[Equation 1]

$$Z_{1/e} = \frac{\lambda}{2 \times \pi \times \sqrt{n_1^2 \times \sin^2\theta - n_2^2}} \quad (1)$$

In Equation (1), λ represents a wavelength of the light, $n_1$ represents a refractive index of the waveguide 11, θ represents an angle of incidence of the light relative to the first plane fs1, and $n_2$ represents a refractive index of a medium (refractive index of 1 for air in the present embodiment) disposed between the waveguide 11 and the deflector 12.

Further, when the distance between the first plane fs1 and the third plane fs3 is Z, the transmittance I of the light is calculated by the following Equation (2).

[Equation 2]

$$I = \exp\left(-\frac{Z}{Z_{1/e}}\right) \quad (2)$$

Accordingly, a distance between the first plane fs1 and the third plane fs3 for allowing an evanescent wave to be transmitted with a desired transmittance I can be obtained using Equations (1) and (2). In the present embodiment, the waveguide 11 and the deflector 12 are stacked as being spaced apart from each other at a distance that has been determined as appropriate for transmitting an evanescent wave with a transmission of 5%.

It should be noted, however, that red light, green light, and blue light, that are different from one another in wavelength, are caused to enter the optical element 10, and thus the distance between the first plane fs1 and the third plane fs3 is adjusted so that the distance calculated from Equations (1) and (2) can be effective with respect to blue light with a shortest wavelength. As can be appreciated from Equation (1), the propagation distance of the evanescent wave becomes smaller as the wavelength becomes shorter. Therefore, it may be designed to allow an evanescent wave to propagate from to the first plane fs1 to the third plane fs3 with respect to light having the shortest wavelength, to thereby also allow an evanescent wave of light of other wavelengths to propagate from the first plane fs1 to the third plane fs3.

As can be appreciated from Equation (1), such factors as the refractive index $n_1$ of the waveguide 11, the angle of incidence $\theta$ of light relative to the first plane fs1, and the refractive index $n_2$ of a medium between the waveguide 11 and the deflector 12 may vary the distance to be calculated between the first plane fs1 and the third plane fs3. However, the distance between the first plane fs1 and the third plane fs3 at least needs to be adjusted to 1 μm or less.

The spacers 13 for defining the aforementioned minute distance between the first plane fs1 and the third plane fs3 may be formed on the first plane fs1 of the waveguide 11 by a conventionally-known method such as vapor-deposition using a mask, lift-off, and nanoimprint. In order for reliably bonding to each other the spacers 13 formed on the waveguide 11 and the third plane fs3 of the deflector 12, the waveguide 11 having the spacers 13 formed thereon and the deflector 12 are sealed therebetween in a vacuum chamber and then moved into the atmospheric pressure after the sealing, so that the spacers 13 each adhere to the third plane fs3.

The second plane fs2 has an end area along the length direction dl defined as the incident area ia. Meanwhile, the remaining area other than the incident area ia on the second plane fs2 is defined as the emission area ea. In the incident area ia, a light flux Lx is perpendicularly incident on the second plane fs2 from outside of the optical element 10. The perpendicularly incident light flux Lx enters the deflector 12 through the waveguide 11, and obliquely reflected at the triangular prism array surface ps. The light flux Lx thus obliquely reflected at the triangular prism array surface ps enters again the waveguide 11.

The obliquely incident light flux Lx is totally reflected at the second plane fs2. The light flux Lx that has been totally reflected at the second plane fs2 is reflected for the most part at the first plane fs1. Subsequently, the light flux Lx propagates in the length direction dl while being repeatedly subjected to the total reflection at the second plane fs2 and to the reflection at the first plane fs1. As described above, however, an evanescent wave is transmitted through the first plane fs1 to the deflector 12. Although the light flux Lx is simply illustrated by the two dotted lines in FIG. 2, the light flux Lx practically has a width.

If the refractive index of the waveguide 11 is higher than the refractive index of the deflector 12, then the angle of emission is narrower when the light flux Lx enters the waveguide 11 from the deflector 12. If the angle of emission narrows, the number of reflections increases for the unit propagation distance in the length direction dl. An evanescent wave is generated each time the light flux Lx is reflected at the first plane fs1, and thus, the increase in number of reflections makes it difficult to propagate the light flux Lx from the incident area is to the opposite end of the optical element 10. Therefore, the refractive index of the waveguide 11 is preferably smaller than the refractive index of the deflector 12. Here, the refractive index of quartz is 1.45 and the refractive index of acrylic is 1.49, which means that the refractive index of the waveguide 11 is smaller than the refractive index of the deflector 12.

A plurality of first and second triangular prisms 16a and 16b are formed along the width direction dw on the triangular prism array surface ps. The first triangular prisms 16a are formed below the incident area ia, and the second triangular prisms 16b are formed below the emission area ea. The first and second triangular prisms 16a and 16b each have an inclined surface, defined by inclining a plane perpendicular to the thickness direction dt about a line parallel to the width direction dw, and a perpendicular surface perpendicular to the length direction dl.

The inclined surfaces of the first triangular prism 16a and the second triangular prism 16b are inclined in opposite directions, and the absolute values of the inclination angles are equivalent. A normal line from the inclined surface of the first triangular prism 16a extends toward the emission area ea side of the waveguide 11. Accordingly, as described above, the light flux Lx perpendicularly incident on the incident area ia from the first plane fs1 is reflected by the first triangular prism 16a toward the emission area ea. Meanwhile, a normal line from the inclined surface (reflecting surface) of the second triangular prism 16b extends toward the incident area ia side of the waveguide 11. Accordingly, as described in detail below, the light flux Lx that obliquely enters the deflector 12 from the third plane fs3 is reflected perpendicularly toward the second plane fs2.

The angle of the inclined surface is determined based on the critical angle at the second plane fs2 of the waveguide 11. In order to achieve the effects of the present embodiment, the light flux Lx that has entered obliquely the waveguide 11 is required to propagate, within the waveguide 11, in the length direction dl while being repeatedly subjected to the total reflection at the second plane fs2 and to the reflection at the first plane fs1. Therefore, the light flux Lx needs to enter the waveguide 11 in such a manner that total reflection occurs at the second plane fs2.

The angle of incidence $\theta$ (predetermined angle) with respect to the second plane fs2 needs to be larger than the critical angle, and thus the condition of $\theta > \sin^{-1}(1/n_1)$ needs to be satisfied. As described above, the refractive index of quartz, which is the material for the waveguide 11 in the present embodiment, is 1.45. Therefore, the following condition needs to be satisfied: $\theta > \sin^{-1}(1/1.45) = 43.6°$.

Since the angle of incidence $\theta$ is double the angle of the inclined surface of the first triangular prism 16a, the angle of the inclined surface needs to be at least 21.8°, i.e. the half angle of the angle of incidence $\theta$ (=43.6°/2). Note that the different materials are used for the waveguide 11 and the deflector 12, yet as described above, the refractive index of the deflector 12 is larger than the refractive index of the waveguide 11, and therefore by defining the angle of the inclined surface in the deflector 12 to be 21.8° or more, total reflection of the light flux Lx can be achieved at the second plane fs2.

On the other hand, as the inclination angle of the inclined surface increases, more light is lost from the light flux Lx due to vignetting because of the perpendicular surface of the adjacent first triangular prism 16a. Therefore, the inclination angle of the inclined surface is preferably near the lower limit. Hence, in the present embodiment, the inclination angle of the inclined surface is, for example, set to 25°.

When the inclination angle of the inclined surface is set to 25°, the light flux Lx perpendicularly incident on the second plane fs2 in the incident area ia is reflected by the inclined surface so as to be incident on the second plane fs2 in the emission area ea at an angle of incidence of 51.6°. Accordingly, the angle of incidence at the second plane fs2 is larger than the critical angle, and thus the light flux Lx can be totally reflected at the second plane fs2.

The plurality of the first and second triangular prisms 16a and 16b are aligned along the length direction dl. Accordingly, as seen from the width direction dw, the first and second triangular prisms 16a and 16b are aligned in sawtooth form. The pitch of the first and second triangular prisms 16a and 16b is, for example, 0.9 mm.

As the pitch of the first and second triangular prisms 16a and 16b is larger, more light is lost from the light flux Lx due to vignetting because of the perpendicular surfaces of the adjacent first and second triangular prisms 16a and 16b. Conversely, if the pitch is excessively small, the reflected light does not reflect regularly due to the effect of diffraction. Therefore, the pitch is preferably 0.3 mm or more. In the present embodiment, the width of the incident light flux Lx is assumed to be 5 mm to 10 mm. Accordingly, the above pitch of 0.9 mm is reasonable.

The light flux Lx that has been perpendicularly incident, from outside of the optical element 10, on the incident area ia of the second plane fs2 in the optical element 10 with the above structure is reflected by the first triangular prisms 16a and then obliquely enters the emission area ea of the waveguide 11. The obliquely entering light flux Lx is then incident on the second plane fs2 at an angle exceeding the critical angle and is totally reflected. The totally reflected light flux Lx is then obliquely incident on the first plane fs1, with 95% of the light flux Lx being reflected and 5% thereof transmitted. The light flux Lx reflected by the first plane fs1 is again incident on the second plane fs2 at an angle exceeding the critical angle and is totally reflected.

Subsequently, the light flux Lx propagates in the length direction dl of the waveguide 11 while being repeatedly subjected to the partial reflection at the first plane fs1 and to the total reflection at the second plane fs2. Upon the light flux Lx being reflected at the first plane fs1, however, 5% of the light flux Lx with respect to blue light and approximately 5% of the light flux Lx with respect to green light and red light penetrate into the interspace between the first plane fs1 and the third plane fs3, and the light flux Lx reaches the deflector 12.

The angle of emission of the light flux Lx reaching to enter the deflector 12 is equivalent to the angle of incidence, at the interface with the waveguide 11, of the light flux Lx reflected by the first triangular prisms 16a. Therefore, the light flux Lx emitted into the deflector 12 is reflected by the second triangular prisms 16b in a direction perpendicular to the second plane fs2. The perpendicularly reflected light flux Lx passes through the third plane fs3, the interspace, the first plane fs1, and the second plane fs2, with a transmittance of substantially 100% and is emitted from the second plane fs2.

The waveguide 11 has an length of, for example; 100 mm in the length direction dl, and the light flux Lx obliquely incident on the emission area ea from the incident area ia is reflected approximately 20 times between the second plane fs2 and the first plane fs1 before reaching the edge of the emission area ea. Each time the light flux Lx is reflected at the first plane fs1, the optical path is branched, and light is emitted from the second plane fs2 as described above.

Therefore, for a length of 100 mm, an array of approximately 20 branches of light is formed. Accordingly, in order to emit the branches of light from the second plane fs2 with no gap therebetween, it is necessary for the incident light flux Lx to have a diameter of 5 mm (100 mm/20) or more.

Figure 3:
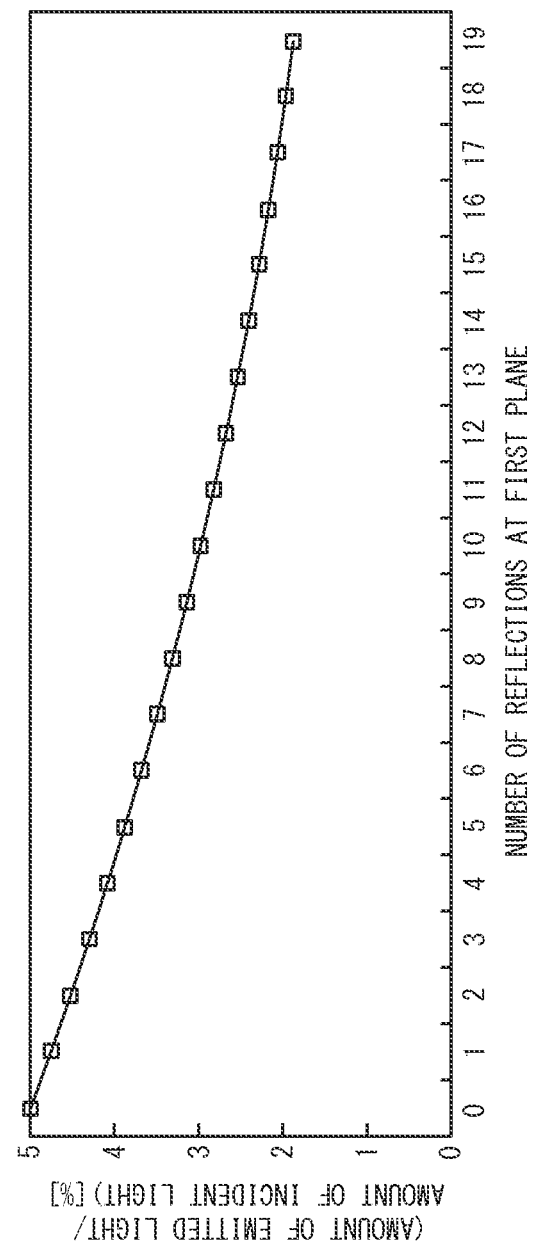
FIG. 3 is a graph showing the ratio of intensity of transmitted evanescent light to incident light, according to the number of reflections at a first plane in the optical element of the first embodiment.

As described above, each time the light flux Lx that propagates in the waveguide 11 is reflected at the first plane fs1, a portion of the light is emitted as a branch of light, and therefore the intensity of the emitted light decreases as a geometric progression in accordance with the number of reflections (see FIG. 3). Hence, if the transmittance of the deflector 12 with respect to obliquely incident light is increased, it becomes difficult to propagate the incident light flux Lx to the end of the waveguide 11.

In the present embodiment, the transmittance that should be set for the first plane fs1 with respect to incident light is simply set to 100%/(number of reflections). Using the above-described number of reflections yields a transmittance of 5%. Furthermore, calculating reflectance as 100%−(transmittance %) yields a reflectance of 95%.

Using the transmittance and the reflectance defined as described above, the intensity ratio between the light flux Lx that is emitted first to the light flux Lx that is emitted last from the second plane fs2 is approximately 2.5. The brightness is thus clearly uneven. In order to reduce the unevenness in the brightness, it suffices to set the transmittance lower. For example, setting the transmittance to 3% and the reflectance to 97% improves the intensity ratio of the light flux Lx that is emitted first to the light flux Lx that is emitted last from the second plane fs2 to approximately 1.8.

By setting the transmittance to be small, however, the amount of light that reaches the edge of the emission area ea without being emitted increases, thus increasing the energy loss of the incident light flux Lx. In other words, the use efficiency of the incident light flux Lx lowers. With the transmittance set to 5% and the reflectance to 95% in the present embodiment, the total amount of the light flux Lx that is emitted from the second plane fs2 is 64% of the incident light flux Lx. On the other hand, with the transmittance set to 3% and the reflectance to 97% in the above example for comparison, the total amount of the light flux Lx that is emitted from the second plane fs2 decreases to 46% of the incident light flux Lx.

In this way, attempting to reduce the unevenness in the brightness also reduces the use efficiency of light. Therefore, the transmittance is preferably set so as to optimize both the unevenness in the brightness and the use efficiency of light. Since the sensitivity of visual perception is logarithmic, an unevenness in the brightness of approximately a factor of 2.5 is not easily perceived. Therefore, the setting for transmittance in the present embodiment maintains a high use efficiency of light while suppressing the unevenness in the brightness low enough for intended use, allowing for actual formation of the optical element 10.

In the optical element 10 with the above-described structure, approximately 20 light fluxes Lx are emitted per 100 mm. Therefore, by causing a light flux Lx with a width of 5 mm or more to be incident on the incident area ia of the second plane fs2, adjacent emitted light fluxes Lx come into contact with each other so as to be emitted as a light flux with a total width of 100 mm. In other words, the light flux is expanded from a width of 5 mm to 100 mm, so that the optical element 10 functions as a pupil enlarging optical element, as in the case of a conventional technique.

According to the optical element 10 of the first embodiment with the above structure, the light flux Lx entering the optical element 10 is expanded and emitted without utilizing the diffraction phenomenon of light. Accordingly, even if the light flux Lx including a plurality of visible lights having different wavelengths enter the optical element 10, the light flux Lx is allowed be emitted from the second plane fs2 in the same emitting direction regardless of the wavelength. Therefore, the optical element 10 may also be used for enlarging multicolor image light, without generating multiple images resulting from displacement of the image light for each wavelength.

Further, according to the optical element 10 of the first embodiment, the light flux Lx entering the optical element 10 can be expanded and emitted from only the second plane fs2, which is one plate surface of a flat plate. Therefore, while having a function of enlarging the pupil, the optical element 10 also offers improved use efficiency of light as compared to an optical element using a conventional volume hologram sheet that expands and emits light fluxes from both surfaces. With the use efficiency of light thus improved, the amount of light to be emitted from the light source can be reduced as compared to conventional techniques, thereby allowing for a reduction in power consumption.

Next, an optical element according to a second embodiment of the present invention is described. The second embodiment is different from the first embodiment in that the second embodiment further includes a field angle amplifying optical system 170 disposed on the second plane fs2 side of the optical element. In the following, the second embodiment is described focusing on the differences from the first embodiment. Note that components with the same function and structure as those in the first embodiment are denoted by the same reference symbols, and the description thereof is omitted.

Figure 4:
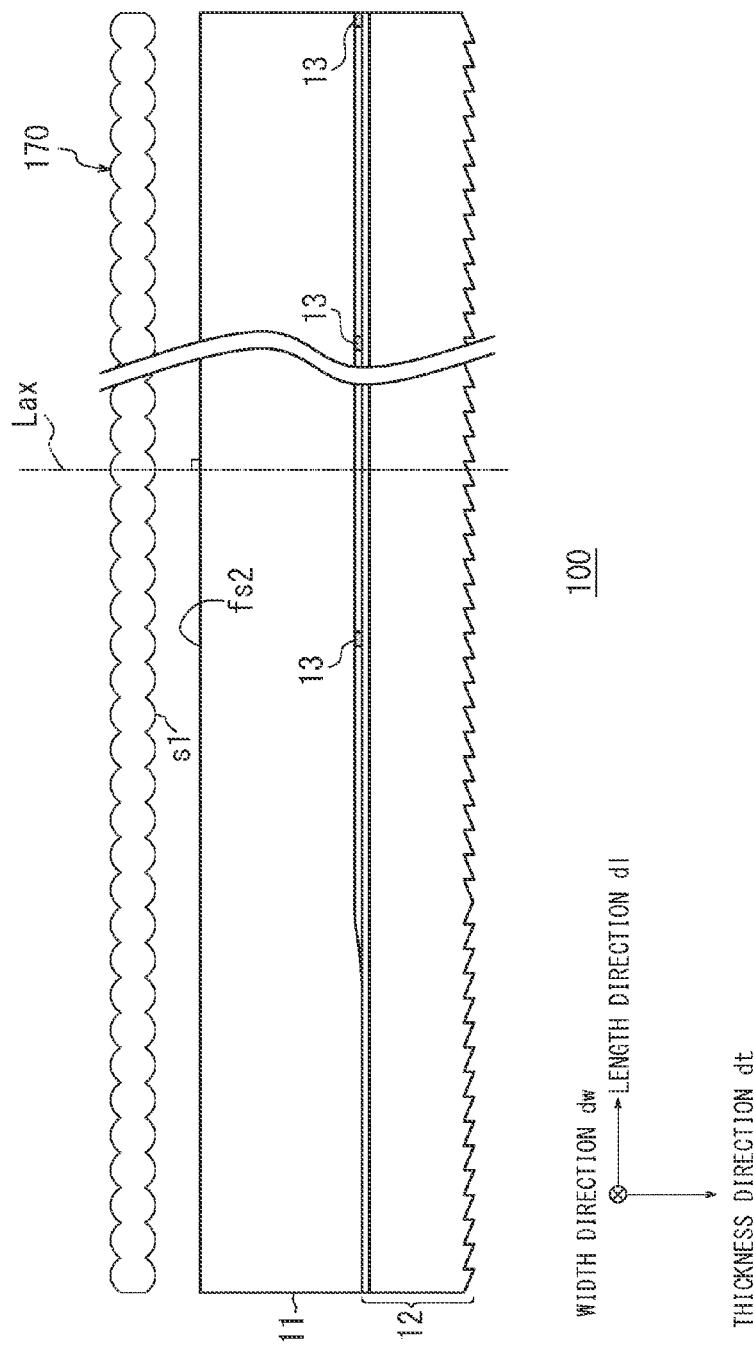
FIG. 4 is a side view of an optical element of a second embodiment of the present invention.

As illustrated in FIG. 4, the optical element 100 of the second embodiment includes a waveguide 11, a deflector 12, spacers 13, and the field angle amplifying optical system 170. The waveguide 11, the deflector 12, and the spacers 13 each have the same function, structure, and arrangement as those of the first embodiment. Unlike the first embodiment, in the second embodiment, the field angle amplifying optical system 170 is disposed on the second plane fs2 side of the waveguide 11.

Figure 5:
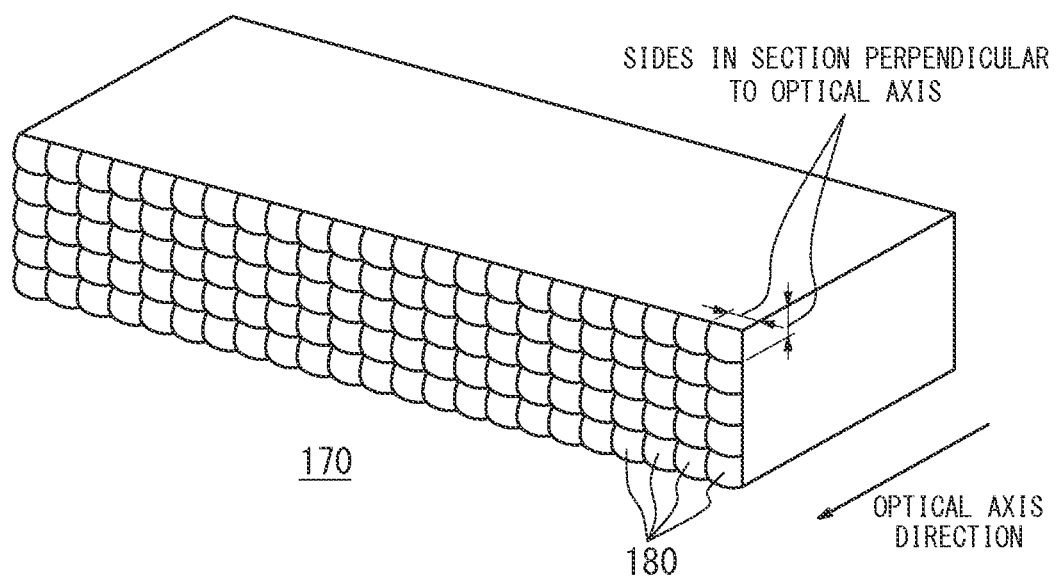
FIG. 5 is a perspective view of a field angle amplifying optical system.
Figure 6:
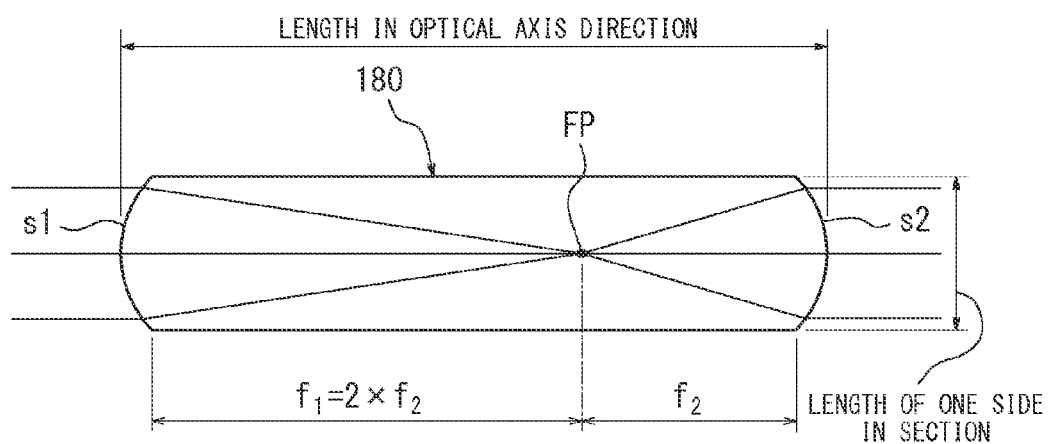
FIG. 6 is a side view of a rod lens.

As illustrated in FIG. 5, the field angle amplifying optical system 170 is a lens array formed of a plurality of prismatic rod lenses 180 which are arranged to have their optical axes in parallel to one another. The rod lenses 180 are formed of a member such as quartz having a relatively small color dispersion, and function as an a focal optical system of, for example, 3.28 mm in length in the optical axis direction and 0.3 mm on a side in section perpendicular to the optical axis. Further, as illustrated in FIG. 6, in each of the rod lenses 180, a rear focal point of a first plane s1 and a front focal point of a second plane s2 coincide with each other at a focal point FP, where the focal distance of the first plane s1 is twice the focal length of the second plane s2. Therefore, the rod lenses 180 are each capable of doubling the field angle of an image to be incident on the first plane s1.

As illustrated in FIG. 4, the field angle amplifying optical system 170 is fixed on the second plane fs2 side so that the first plane s1 is opposed to the second plane fs2 of the waveguide 11 and the normal line of the second plane fs2 is parallel to the optical axis Lax of the rod lens 180.

According as well to the optical element 100 of the second embodiment with the above structure, even if the light flux Lx including a plurality of visible lights having different wavelengths enter the optical element 100, the light flux Lx is allowed to be emitted from the second plane fs2 with suppressed deviation in the emitting direction regardless of the wavelength. Although chromatic aberrations may be generated in the rod lens 180, deviation in the emitting direction can still be suppressed in the optical element 100 as a whole since the rod lens 180 is formed of a member having a small color dispersion. Further, the optical element 100 of the second embodiment also offers improved use efficiency of light.

In addition, the optical element 100 of the second embodiment is capable of reducing the unevenness around the image. An evanescent wave from the waveguide 11 to the deflector 12 has a spectral transmittance that shows angular dependence (see FIGS. 1 to 9), and the transmittance of the evanescent wave decreases along with the increase in angle of incidence of light from the second plane fs2 to the first plane fs1 within the waveguide 11.

When the transmittance decreases according to the angle of incidence, the field angle of an image to be projected from the second plane fs2 may vary depending on the position. Accordingly, an image having a wide field angle to the observer's eyeball is dark in the periphery thereof. However, according to the optical element 100 of the second embodiment, which amplifies the field angle to double, the unevenness in brightness in the periphery of an image can be alleviated.

Next, an optical element according to a third embodiment of the present invention is described. The third embodiment is different from the first embodiment in that the third embodiment has a film disposed between the waveguide and the deflector. In the following, the third embodiment is described focusing on the differences from the first embodiment. Note that components with the same function and structure as those in the first embodiment are denoted by the same reference symbols, and the description thereof is omitted.

Figure 10:
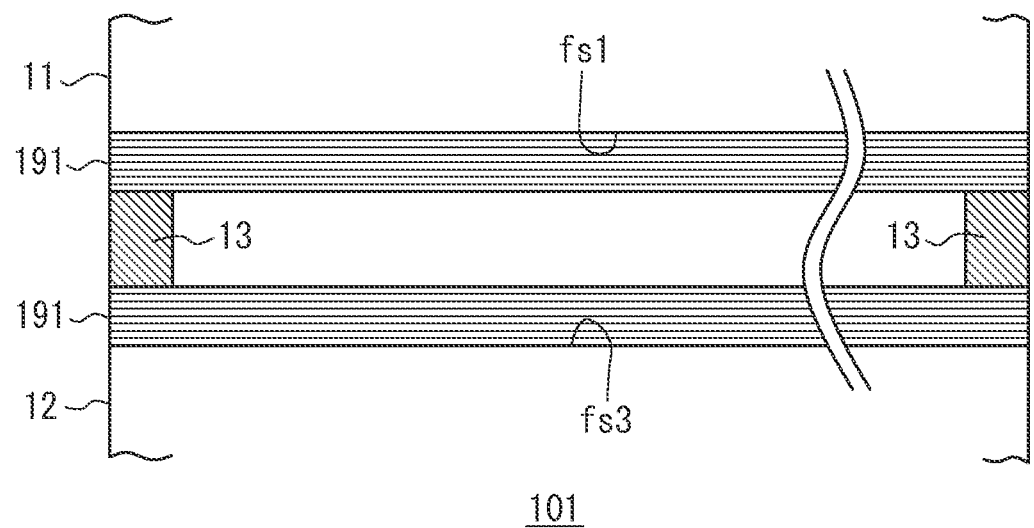
FIG. 10 is an enlarged side view of an optical element of a third embodiment of the present invention.

As illustrated in FIG. 10, the optical element 101 of the third embodiment includes a waveguide 11, a deflector 12, spacers 13, and a multilayer film 191. The waveguide 11, the deflector 12, and the spacers 13 each have the same function, structure, and arrangement as those of the first embodiment. Unlike the first embodiment, in the third embodiment, the multilayer film 191 is provided on the first plane fs1 of the waveguide 11 and on the third plane fs3 of the deflector 12.

Figure 7:
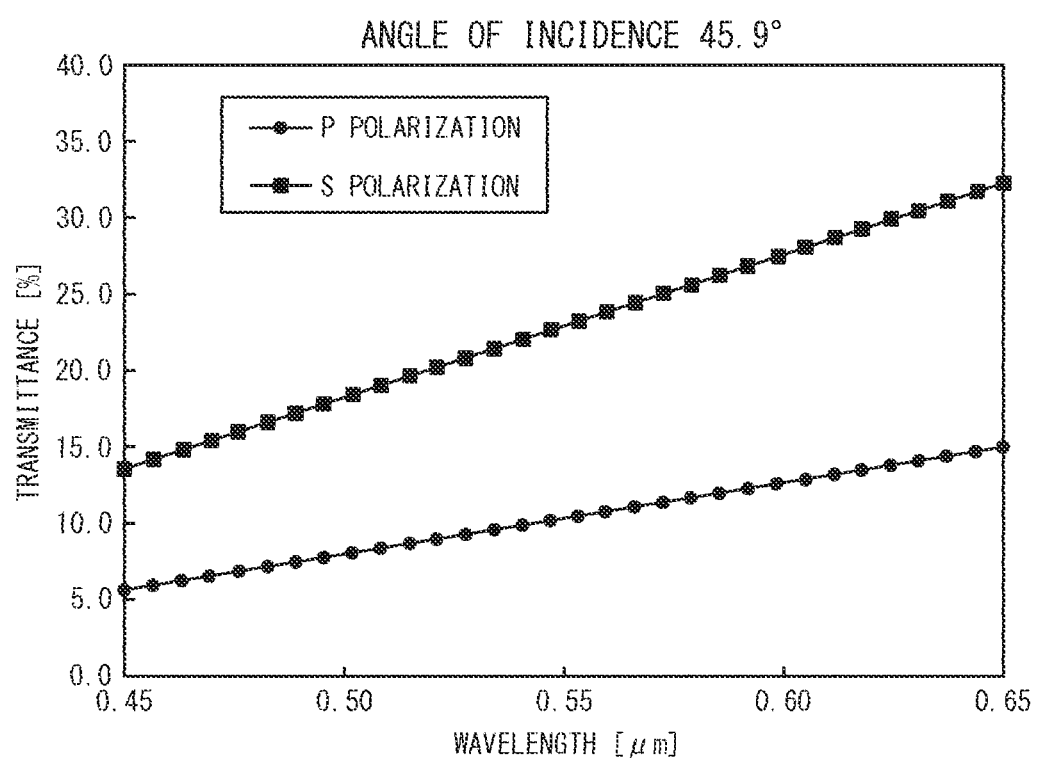
FIG. 7 is a graph showing the transmittance relative to the wavelength of an evanescent wave at an angle of incidence of 45.9°.
Figure 8:
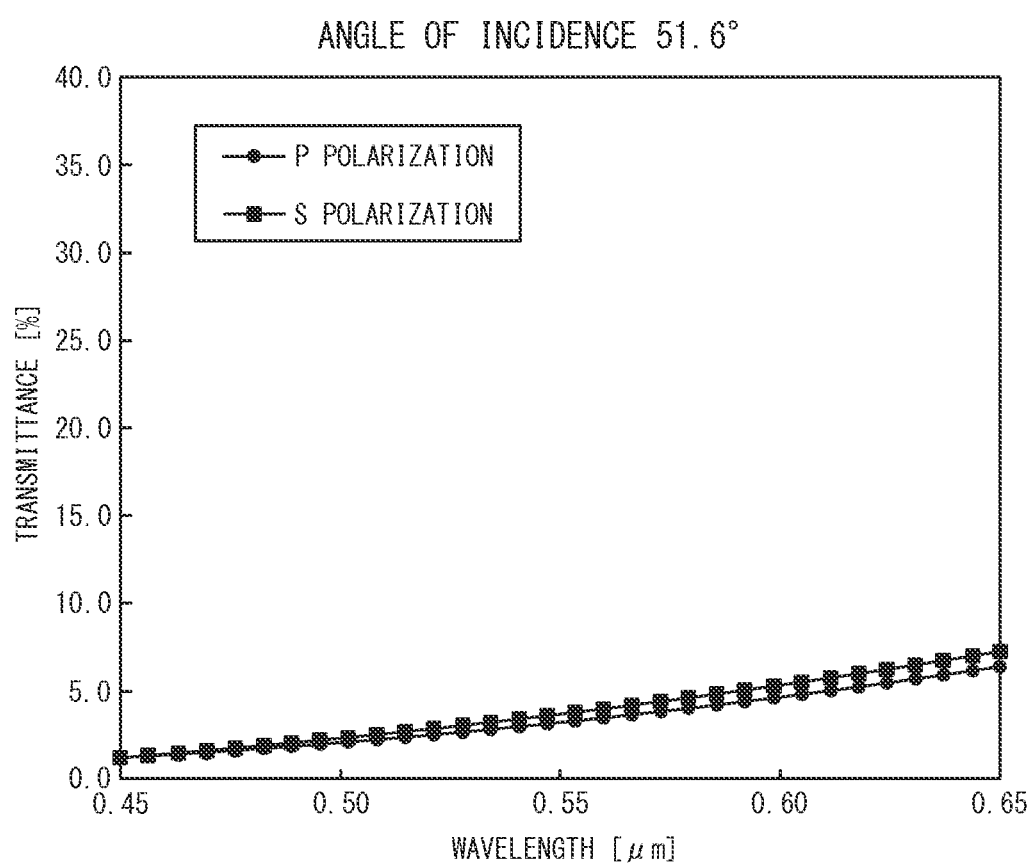
FIG. 8 is a graph showing the transmittance relative to the wavelength of an evanescent wave at an angle of incidence of 51.6°.
Figure 9:
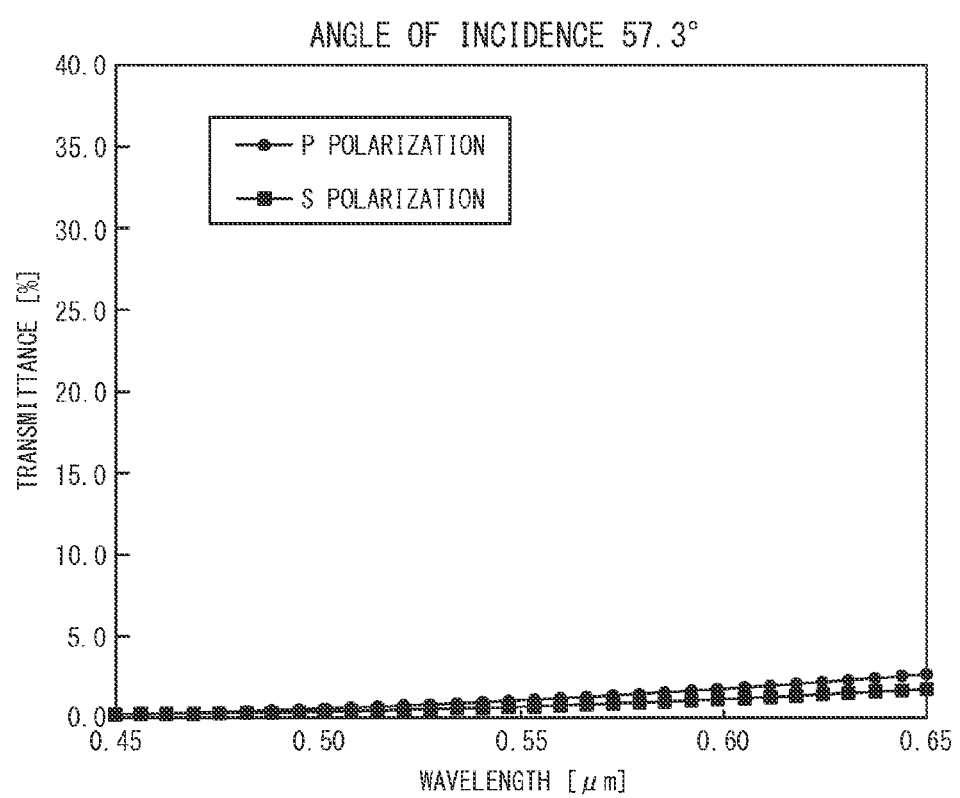
FIG. 9 is a graph showing the transmittance relative to the wavelength of an evanescent wave at an angle of incidence of 51.3°.

An evanescent wave has a spectral transmittance that shows wavelength dependence, and the transmittance varies depending on the wavelength of light (see FIGS. 7 to 9). Further, as described above, an evanescent wave has a spectral transmittance that shows angular dependence, and the transmittance varies depending on the angle of incidence. The multilayer film 191 is designed to have layered films that are different from one another in transmittance so as to reduce the wavelength dependence and the angular dependence of the spectral transmittance of the evanescent wave.

Figure 11:
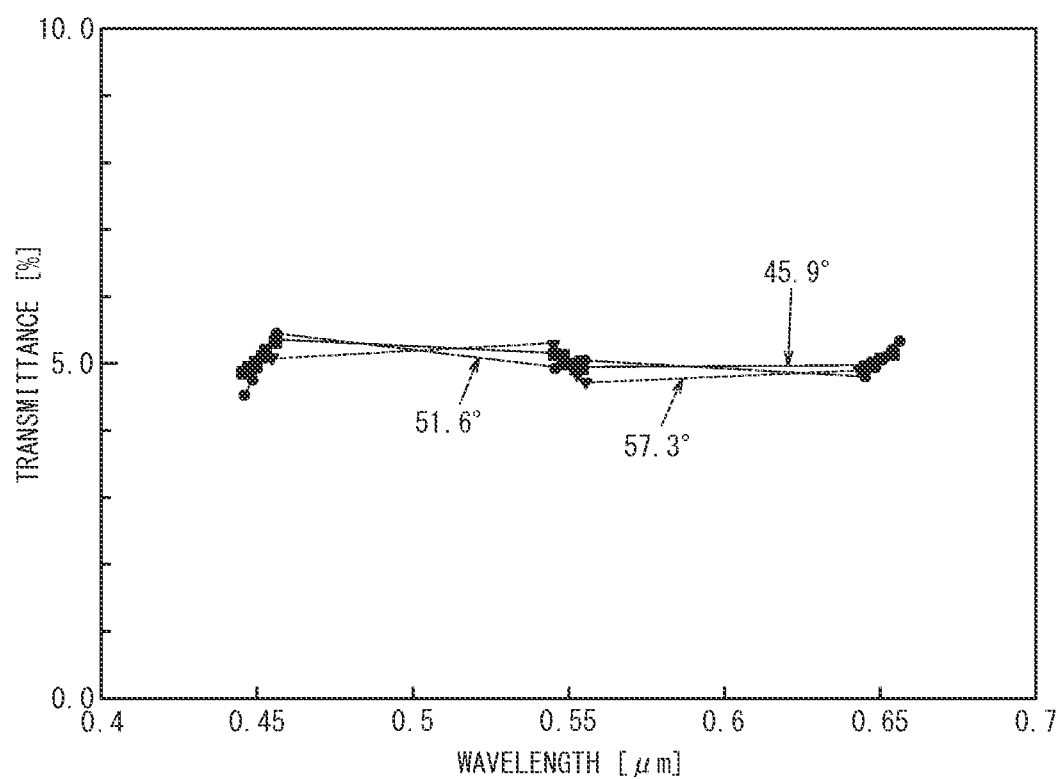
FIG. 11 a graph showing the transmittance relative to the wavelengths of evanescent waves at different angles of incidence in the optical element of the third embodiment.

For example, Table 1 shows media denoted by layer numbers, which may be laminated in order from the first plane fs1 side of the waveguide 11 and Table 2 shows media denoted by layer numbers, which may be laminated in order from the third plane fs3 side of the deflector 12, to thereby reduce the wavelength dependence and the angular dependence of the spectral transmittance of the evanescent wave as shown in FIG. 11.

TABLE 1

| Layer Number | Refractive Index | Film Thickness (μm) |
|---|---|---|
| 1 | 1.84 | 0.165 |
| 2 | 2.18 | 0.038 |

TABLE 1-continued

| Layer Number | Refractive Index | Film Thickness (µm) |
|---|---|---|
| 3 | 1.38 | 0.127 |
| 4 | 2.18 | 0.047 |
| 5 | 1.61 | 0.051 |
| 6 | 2.33 | 0.093 |
| 7 | 1.38 | 0.182 |
| 8 | 2.03 | 0.043 |

TABLE 2

| Layer Number | Refractive Index | Film Thickness (µm) |
|---|---|---|
| 1 | 2.37 | 0.117 |
| 2 | 1.38 | 0.063 |
| 3 | 2.38 | 0.100 |
| 4 | 1.63 | 0.126 |
| 5 | 2.38 | 0.092 |
| 6 | 1.40 | 0.068 |
| 7 | 2.38 | 0.123 |
| 8 | 1.71 | 0.010 |

According as well to the optical element 101 of the third embodiment with the above structure, even if the light flux Lx including a plurality of visible lights having different wavelengths enter the optical element 101, the light flux Lx is allowed to be emitted from the second plane fs2 with no deviation in the emitting direction regardless of the wavelength. Further, the optical element 101 of the third embodiment also offers improved use efficiency of light.

In addition, according to the optical element 101 of the third embodiment, the angular dependence of the evanescent wave is alleviated by means of the multilayer film 191, which can alleviate the unevenness in the brightness on the periphery of an image.

Further, according to the optical element 101 of the third embodiment, the wavelength dependence of the evanescent wave is alleviated by means of the multilayer film 191, which offers improved color reproductivity in a color image emitted from the emission area, with respect to a color image incident on the incident area.

For example, in the case of emitting a color image constituted of three colors of R, G, B, if the evanescent wave has a spectral transmittance that has a wavelength dependence, the quantities of chromatic components constituting the color image to be emitted become smaller in the order of B, G, R as compared to the original image, due to the difference in transmittance for each color of R, G, B. As a result, the color image suffers deterioration in its color reproductivity.

Therefore, in the absence of the multilayer film 191, the quantities of chromatic components of a color image to enter the optical element 100 may preferably be adjusted in advance in order to emit a desired color image from the emission area ea. On the other hand, according to the optical element 101 of the third embodiment, the transmittance for the evanescent wave is substantially constant regardless of the wavelength, which can offer improved color reproductivity in a color image without the need of adjusting the chromatic components of the color image before entering the optical element 100.

Next, an optical element according to a fourth embodiment of the present invention is described. The fourth embodiment is different from the first embodiment in that the distance between the waveguide 11 and the deflector 12 varies. In the following, the fourth embodiment is described focusing on the differences from the first embodiment. Note that components with the same function and structure as those in the first embodiment are denoted by the same reference symbols, and the description thereof is omitted.

Figure 12:
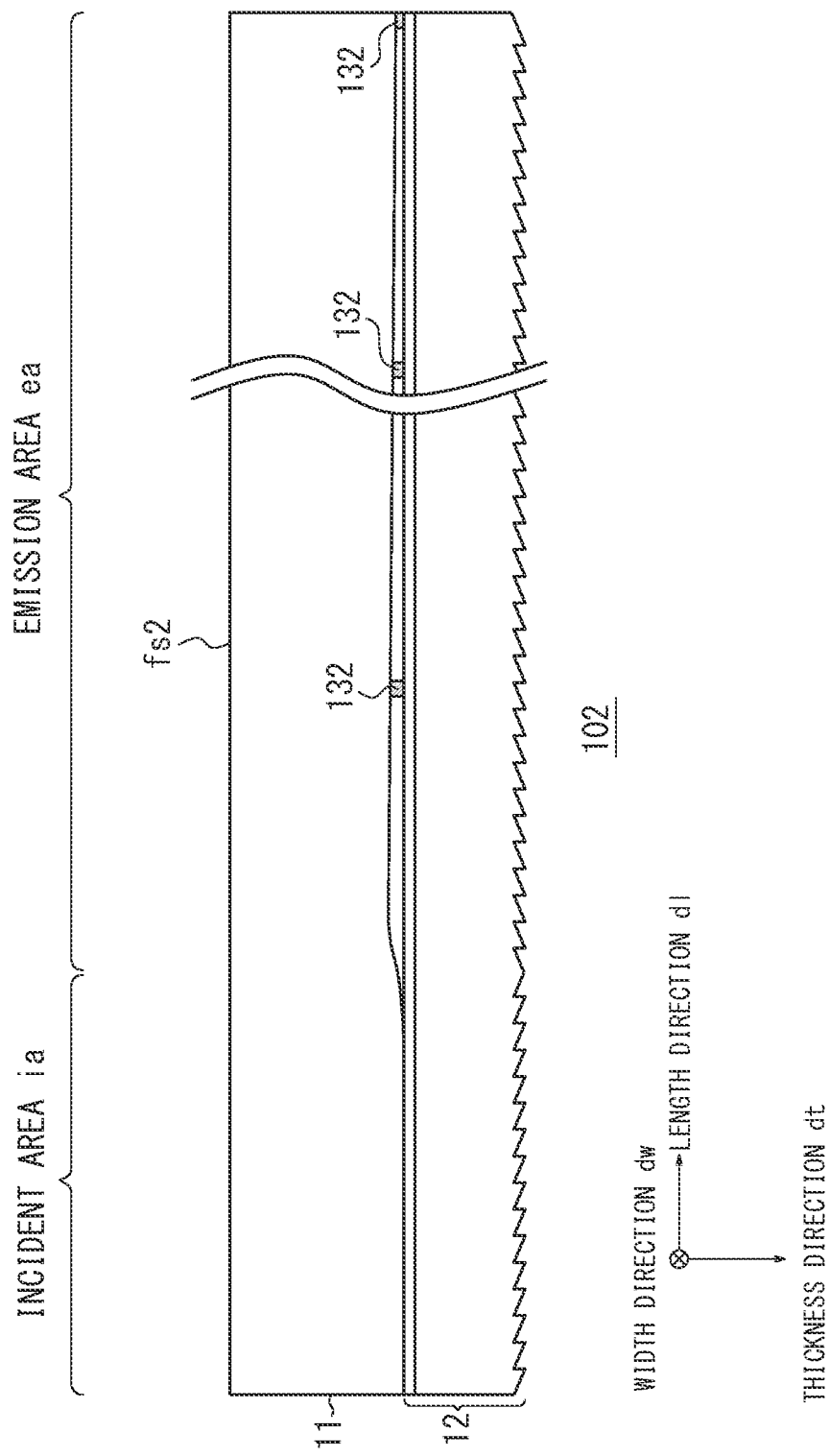
FIG. 12 is a side view of an optical element of a fourth embodiment of the present invention.

As illustrated in FIG. 12, the optical element 102 of the fourth embodiment includes a waveguide 11, a deflector 12, and spacers 132. The waveguide 11 and the deflector 12 each have the same function and structure as those of the first embodiment. Unlike the first embodiment, in the fourth embodiment, the spacers 132 are not constant in height, and formed to have a reduced height along the length direction dl from the incident area to the emission area direction. Therefore, the distance between the waveguide 11 and the deflector 12 decreases along the length direction dl from the incident area to the emission area.

Figure 13:
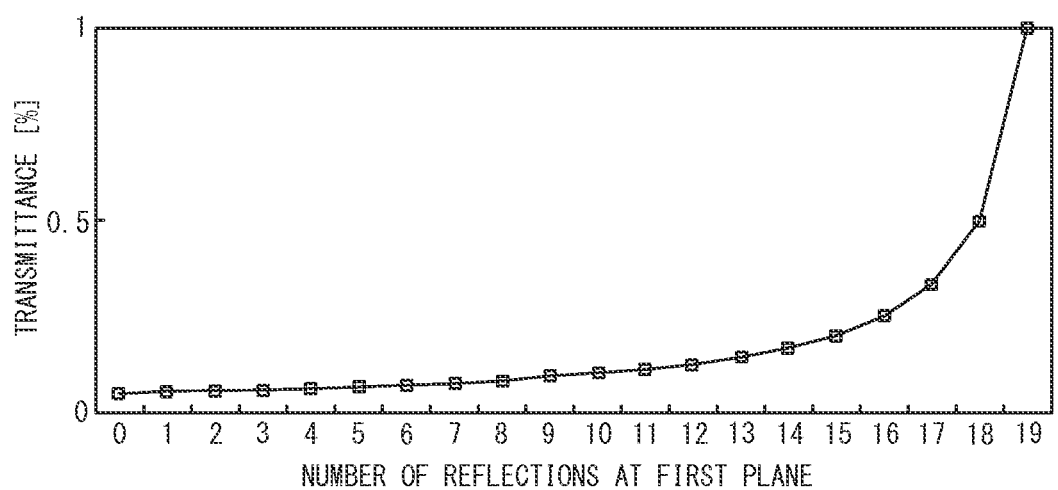
FIG. 13 is a graph showing the transmittance of an evanescent wave relative to the number of reflections at the first plane of the waveguide of the optical element of the fourth embodiment.
Figure 14:
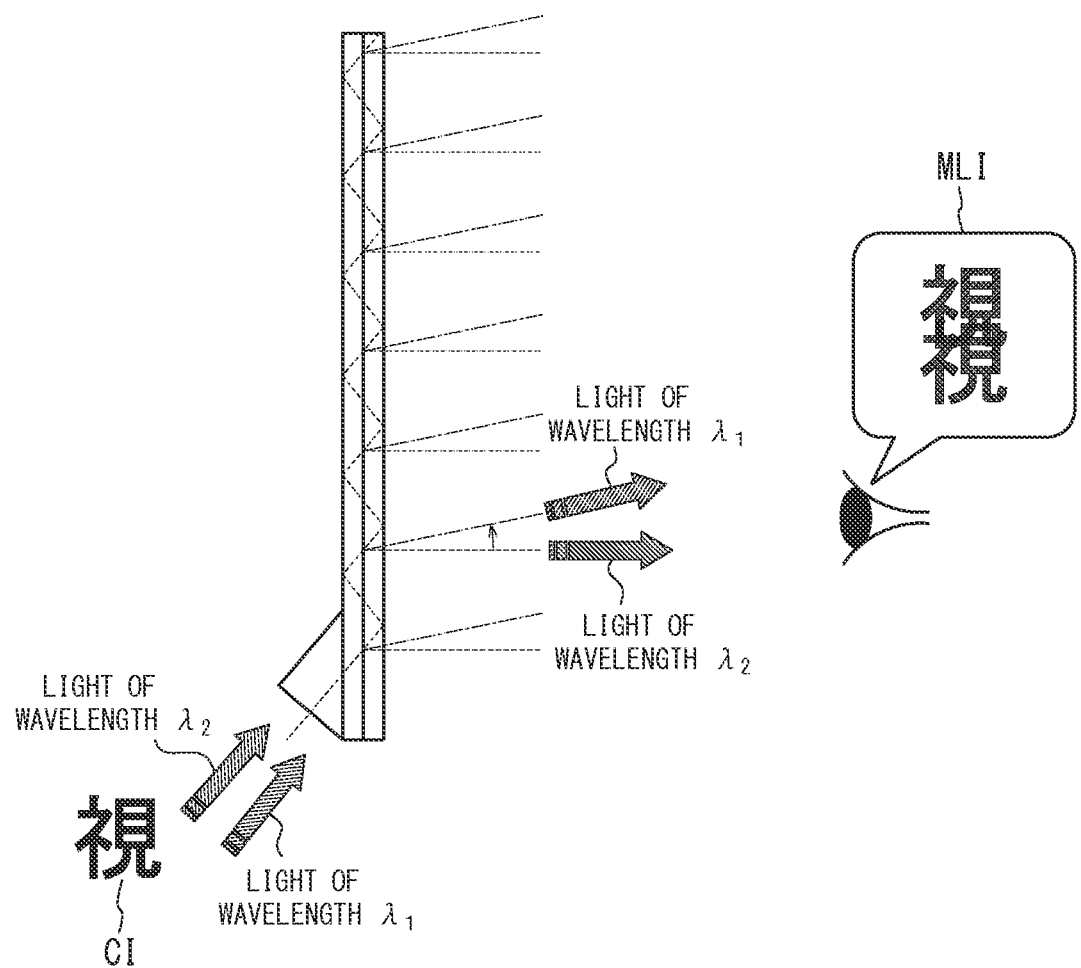
FIG. 14 is a view for illustrating how a color image is multiplexed by a conventional optical element having a pupil expansion function.

The distance thus reduced, depending on the position from the incident area side to the emission area side, allows the transmittance of an evanescent wave to be increased according to the number of reflections at the first plane fs1, as shown in FIG. 13. The distance between the waveguide 11 and the deflector 12 may be adjusted so as to transmit an evanescent wave with a transmission of 5% of the amount of light incident on the optical element 102, regardless of the transmission position of the evanescent wave to the deflector 12.

According as well to the optical element 102 of the fourth embodiment with the above structure, even if the light flux Lx including a plurality of visible lights having different wavelengths enter the optical element 102, the light flux Lx is allowed to be emitted from the second plane fs2 with no deviation in the emitting direction regardless of the wavelength. Further, the optical element 102 of the fourth embodiment also offers improved use efficiency of light.

Further, according to the optical element 102 of the fourth embodiment, the light flux Lx emitted first and the light flux Lx emitted last from the second plane fs2 are allowed to have the same intensity of light, to thereby suppress unevenness in brightness. Further, the transmittance is increased as the number of reflections at the first plane fs1 increases. Therefore, the amount of the light flux Lx that reaches the edge of the emission area ea without being emitted decreases, thus reducing energy loss of the incident light flux Lx.

Embodiments according to a certain aspect to which the present invention is applied have been described based on the drawings or the like. However, it should be noted that various changes and modifications will be readily made by a person skilled in the art based on the present disclosure. Therefore, such changes and modifications are to be understood as included within the scope of the present invention.

For example, in the first to fourth embodiments, the pitch of the first and second triangular prisms 16a, 16b is exemplified as being 0.9 mm, yet the pitch is not limited to 0.9 mm. Furthermore, the pitch need not be consistent. For example, the effects of the above-described embodiments can similarly be achieved even when mixing pitches of 0.8 mm, 0.9 mm, and 1.0 mm.

In the first to fourth embodiments, the waveguide 11 is formed with quartz, yet alternatively a different material may be used. For example, heat-resistant glass such as PYLEX (registered trademark, Corning Incorporated), TEMPAX Float (registered trademark, Schott Aktiengesellschaft), Vycor (registered trademark, Corning Incorporated), or the like, has a refractive index close to that of quartz and is appropriate for formation of the waveguide 11.

In the first to fourth embodiments, the inclination angle of the inclined surface in the first and second triangular prisms 16a, 16b is exemplified as being 25°, yet the inclination angle is not limited to 25°. As long as the majority or substantially all of the light obliquely incident from the second plane fs2 is reflected, and the reflected light is reflected by the second triangular prisms 16b in a direction substantially perpendicular to the second plane fs2, then the inclination angle may be any angle.

In the first to fourth embodiments, an air layer is interposed between the first plane fs1 and the third plane fs3, yet a medium having a lower refractive index than that of the waveguide 11 may be filled therebetween. As long as the medium has a refractive index lower than that of the waveguide 11, only an evanescent wave of the light flux Lx incident on the first plane fs1 may be transmitted within the wave guide 11.

Further, in the first to fourth embodiments, the first plane fs1 and the third plane fs3 are adhered to each other in the incident area ia, yet a medium having a refractive index close to that of the waveguide 11 and the glass white plate 15 may be interposed between the first plane fs1 and the third plane fs3. For example, a transparent plate-like member having the aforementioned refractive index may be held between the first plane fs1 and the third plane fs3 across the entire area of the incident area in.

Further, in the third embodiment, the multilayer film 191 is designed to alleviate both the wavelength dependence and the angular dependence of to the spectral transmittance of the evanescent wave, yet the multilayer film 191 may also be designed to alleviate at least one of the dependences.

REFERENCE SIGNS LIST 10, 100, 101, 102 optical element
11 waveguide
12 deflector
13, 132 spacer
170 field angle amplifying optical system
191 multilayer film
fs1 to fs3 first plane to third plane
Lx light flux
ps triangular prism array surface

The invention claimed is:

1. An optical element, comprising:
a waveguide, formed as a plate having a first plane and a second plane being opposed to each other, that propagates first light incident at a predetermined angle while reflecting the first light between the first plane and the second plane; and
a deflector, formed as a plate having a third plane being opposed to the first plane, the first plane and the third plane being spaced apart from each other at a distance Z, which is smaller than a propagation distance $Z_{1/e}$, for propagating an evanescent wave of the first light at a predetermined transmittance I, the deflector having a plurality of reflecting surfaces arranged, along a first direction, on a rear side of the third plane, the reflecting surfaces reflecting, in a direction substantially perpendicular to the first plane, light that is incident on the first plane at the predetermined angle and propagated as an evanescent wave to the third plane,
wherein the first plane and the third plane have a medium interposed therebetween, the medium having a refractive index lower than the refractive index of the waveguide, and wherein $$I = \exp\left(-\frac{z}{z_{1/e}}\right) \text{ and}$$

$$Z_{1/e} = \frac{\lambda}{2 \times \pi \times \sqrt{n_1^2 \times \sin^2\theta - n_2^2}}$$

and wherein $\lambda$ is a wavelength of the first light, $n_1$ is a refractive index of the waveguide, $\theta$ is the angle of incidence of the light relative to the first plane, and $n_2$ is a refractive index of the medium interposed between the first plane and the third plane.

2. The optical element according to claim 1, wherein the first light is defined by light having a shortest wavelength among a plurality of lights having different wavelengths and entering the optical element.

3. The optical element according to claim 2, further comprising a field angle amplifying optical system disposed on the second plane side, the field angle amplifying optical system amplifying a filed angle of the first light reflected at the reflecting surfaces to be emitted substantially perpendicularly from the second plane.

4. The optical element according to claim 3, further comprising a film disposed between the first plane and the third plane, the film varying the transmittance of an evanescent wave to the deflector obtained when second light that is different in wavelength from the first light is incident on the first plane at the predetermined angle, so as to approximate the transmittance to the transmittance of an evanescent wave to the deflector obtained when the first light is incident on the first plane at the predetermined angle.

5. The optical element according to claim 4, wherein the distance between the first plane and the third plane decreases along the first direction.

6. The optical element according to claim 3, wherein the distance between the first plane and the third plane decreases along the first direction.

7. The optical element according to claim 2, further comprising a film disposed between the first plane and the third plane, the film varying the transmittance of an evanescent wave to the deflector obtained when second light that is different in wavelength from the first light is incident on the first plane at the predetermined angle, so as to approximate the transmittance to the transmittance of an evanescent wave to the deflector obtained when the first light is incident on the first plane at the predetermined angle.

8. The optical element according to claim 7, wherein the distance between the first plane and the third plane decreases along the first direction.

9. The optical element according to claim 2, wherein the distance between the first plane and the third plane decreases along the first direction.

10. The optical element according to claim 1, further comprising a field angle amplifying optical system disposed on the second plane side, the field angle amplifying optical system amplifying a filed angle of the first light reflected at the reflecting surfaces to be emitted substantially perpendicularly from the second plane.

11. The optical element according to claim 10, further comprising a film disposed between the first plane and the third plane, the film varying the transmittance of an evanescent wave to the deflector obtained when second light that is different in wavelength from the first light is incident on the first plane at the predetermined angle, so as to approximate the transmittance to the transmittance of an evanescent wave to the deflector obtained when the first light is incident on the first plane at the predetermined angle.

12. The optical element according to claim 11, wherein the distance between the first plane and the third plane decreases along the first direction.

13. The optical element according to claim 10, wherein the distance between the first plane and the third plane decreases along the first direction.

14. The optical element according to claim 1, wherein the distance between the first plane and the third plane decreases along the first direction.

* * * * *